A. SUNDH.
FLEXIBLE TUBING.
APPLICATION FILED MAR. 9, 1918.
1,311,025. Patented July 22, 1919.
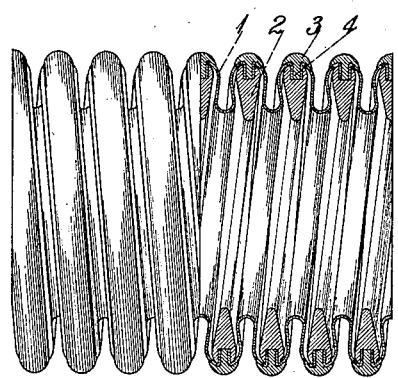
FIG. 1
    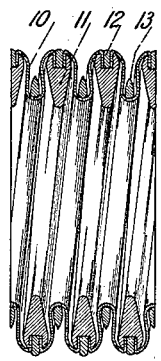
FIG. 2    FIG. 3
INVENTOR
August Sundh
BY
James G. Brikell
ATTORNEY

UNITED STATES PATENT OFFICE.

AUGUST SUNDH, OF HASTINGS-UPON-HUDSON, NEW YORK, ASSIGNOR TO NATIONAL CLUTCH CO., INC., OF NEW YORK, N. Y., A CORPORATION OF NEW YORK.

FLEXIBLE TUBING.

1,311,025.  Specification of Letters Patent.  Patented July 22, 1919.

Application filed March 9, 1918. Serial No. 221,382.

*To all whom it may concern:*

Be it known that I, AUGUST SUNDH, a citizen of the United States, residing at Hastings-upon-Hudson, county of Westchester, and State of New York, have invented certain new and useful Improvements in Flexible Tubing, of which the following is a specification.

This invention relates to an improvement in flexible metallic hose and relates particularly to diaphragmatic metal hose in which the flexibility of the hose is in the metal itself and is not dependent upon sliding joints.

It is an object of the present invention to provide a flexible metallic hose or tubing of the character designated in which the corrugations thereof will be protected from injury and proportionately and uniformly controlled in action.

A still further object of the invention is to provide a hose which will be fluid tight, easy to manufacture, and which will withstand high internal and external pressures without rupture or collapse and which will have comparatively high tensile strength.

In the accompanying drawing I have shown three types of tubing constructed in accordance with the present invention, Figure 1 showing in part sectional elevation one form of my invention; and Figs. 2 and 3 showing two modifications thereof in sectional elevation.

The apparatus of Fig. 1 comprises a diaphragmatic tubing made up of a spirally wound metal strip 1. The adjacent edges of the strip 1 are bent over and forced into a groove formed in the convolutions of a wire spiral 2 in cross section substantially triangular and wound edgewise, being held in place therein by a spirally wound member 3 substantially T-shaped in cross section formed with a rib or projection 4 at the inside of the convolutions thereof, which rib is forced into the groove in the member 2 between the adjacent edges of the strip 1 to bind the members 1, 2 and 3 rigidly together and to form a fluid tight structure.

In order that the tubing may be easily manufactured, the bottom or inside surface of the convolutions of the spirally wound member 2 extend inwardly of the diaphragmatic member 1 to a point slightly beyond the bottom of the loops of said member. The convolutions of the member 3, it will be noted, extend over and protect the surface of the member 1, and by reason of the cross section of the members 2 and 3, the tubing may be flexed without danger of rupture thereof in the curve of the corrugations. The shape of the member 3 and its position relatively to the convolutions of the member 2, will enable the structure, as a whole, to withstand high internal and external pressures without danger of rupture or collapse, and the cross section of the member 3 will insure that the tubing will be well able to withstand any amount of wear and tear without the tubing being broken. By reason of the rigid connection between the members 1, 2 and 3, the whole structure will be of great tensile strength, and as the members 2 and 3 are strong enough to control the member 1 the corrugations of the latter will always be proportionately and uniformly flexed when the tubing is bent and maintained in their proper form. By reason of the particular type of joint between the spirally wound strip 1 and the members 2 and 3, the tubing as a whole will be fluid tight without using packing of any kind which has been found necessary in flexible tubing, as heretofore constructed.

The structure of Fig. 2 is similar to that of Fig. 1, comprising a diaphragmatic member made up of a diaphragmatic strip 5 wound spirally. The adjacent edges of the strip are forced into a groove in the convolutions of a spirally wound member 6 of similar cross section to the member 2 of Fig. 1, and are held rigidly in place by a rib 7 formed on the inner side of the convolutions of a spirally wound member 8, which rib is forced into the groove in the member 6 between the adjacent edges of the strip 5 to form a fluid tight joint. The cross section of the member 6 permits the tubing to be flexed without danger of rupture at the loops and also enables the tubing to withstand high internal pressure. The member 8 is of such a cross section as to partially cover the surface of the strip 5 to protect the same against high external pressures and against wear and tear to which the tubing may be subjected. A wire spiral 9 is placed in the bottom of the inward loops of the member made up of the strip 5 to further strengthen the whole structure and enable it to withstand high internal pressures, this spiral also aiding in maintaining the loops or corrugations in their proper shape. This structure will be of greater tensile strength than the structure of Fig. 1, but possesses practically the same degree of flexibility; in this structure also as in the structure of Fig. 1, the corrugations of the tubing will always be maintained uniformly and proportionately flexed when the tubing is bent and maintained in their proper form. In other words, the tubing is not subjected to bending strains at any one point when in use and will, therefore, withstand a great deal of flexing without danger of rupture.

Fig. 3 shows a still further modification and comprises a member 10 made up of a diaphragmatic metal strip wound spirally. The adjacent edges of this strip are forced into a groove formed in the outer surface of a spirally wound member 11 corresponding to the spiral 2 of Fig. 1, and are held in place by a spirally wound member 12, which is forced into the groove in the member 11 between the adjacent edges of the strip forming the member 10. This construction enables the tubing to be made fluid tight without the use of packing. If desired, the member 12 may be soldered in place. The member 11 which is substantially conical in cross section permits the tubing to be flexed without danger of rupture. A spirally wound member 13 is placed between the loops of the member 10, this member being of substantially the cross section shown, and while permitting the tubing to be flexed prevents the same from breaking, as the spirals 11 and 13 take the stress when the tubing is flexed to any great extent.

It is apparent from the foregoing that I have provided a flexible metallic tubing which will be fluid tight, easy to manufacture, and in which the corrugations will be proportionately and uniformly flexed and, therefore, always maintained in their proper form, and in which the tubing is well able to withstand high internal and external pressures without permanent distortion and without danger of rupture or collapse.

It will also be apparent that the present structure possesses great tensile strength and is, therefore, well adapted for the various uses to which flexible metallic tubing may be put.

It will be further apparent that I have provided a tubing wherein not only are the corrugations well protected against rupture or collapse, but wherein the corrugations may be subjected to any amount of rough usage without danger of permanent injury to the structure.

As others skilled in this art may make various departures from the details of construction described, within the scope of the present invention, I do not wish to be limited thereto except within the scope of the appended claims.

Having thus described my invention what I claim as new and desire to secure by Letters Patent of the United States is:

1. In a flexible metallic tubing, the combination of a wire spiral and a spiral of diaphragmatic material formed in a loop, and rigidly attached to the wire spiral, the wire spiral being substantially triangular in cross section.

2. In a flexible metallic tubing, the combination of a wire having greater depth than thickness and wound edgewise to form a spiral, and a loop of diaphragmatic material spirally wound and interposed between the convolutions of the wire spiral and rigidly attached thereto.

3. In a flexible metallic tubing, the combination of a wire spiral and a spiral of diaphragmatic material formed in a loop, and rigidly attached to the wire spiral, the latter being in cross section substantially triangular and having its thickest portion facing outwardly and secured to the loop of the diaphragmatic material.

4. In a flexible metallic tubing, the combination of two wire spirals one having a recess in its convolutions and the other having a projection coöperating with said recess, and a spirally wound loop of diaphragmatic material having its edges clamped in the said recess of one spiral by the said projection of the other spiral.

5. A flexible metallic tubing, comprising a guiding element consisting of a wire spiral, a strip formed in a loop and spirally wound between the convolutions of the wire spiral for diaphragmatic action and a second wire spiral T-shaped in cross section for binding the diaphragmatic material rigidly to the wire spiral.

6. In a flexible metallic tubing, the combination of a wire spiral and a spiral of diaphragmatic material formed in a loop, and rigidly attached to said wire spiral, and another wire spiral in the bottom of the loop but not rigidly attached thereto, said two wire spirals adapted to protect and control a loop of the diaphragmatic material.

7. In a flexible metallic tubing, the combination of two wire spirals one of said spirals having a recess in its periphery and the other having a projection on the inner side of its convolutions, and a strip formed in a loop and coiled in a spiral and placed between the convolutions of the aforesaid wire spirals with its edges held in said recess by said projection.

8. A flexible metallic tubing comprising diaphragmatic material forming the flexible wall of the tubing, and wire spirals on the outside and inside of said tubing and rigidly secured thereto, said spirals adapted to control and coöperate with the flexible wall of the tubing, and shaped to take the stress thereon when the tubing is flexed.

AUGUST SUNDH.